United States Patent
Suneya

(10) Patent No.: US 10,772,010 B2
(45) Date of Patent: Sep. 8, 2020

(54) TRANSMISSION APPARATUS, METHOD FOR CONTROLLING TRANSMISSION, AND RECORDING MEDIUM

(71) Applicant: CANON KABUSHIKI KAISHA, Tokyo (JP)

(72) Inventor: Toru Suneya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 14/700,496

(22) Filed: Apr. 30, 2015

(65) Prior Publication Data

US 2015/0327279 A1 Nov. 12, 2015

(30) Foreign Application Priority Data

May 7, 2014 (JP) .................................. 2014-096122

(51) Int. Cl.
*H04W 72/08* (2009.01)
*H04W 72/04* (2009.01)
*H04W 28/08* (2009.01)

(52) U.S. Cl.
CPC ..... *H04W 28/085* (2013.01); *H04W 72/0486* (2013.01); *H04W 72/08* (2013.01); *H04W 72/087* (2013.01)

(58) Field of Classification Search
CPC .......................... H04W 72/08; H04W 72/0486
See application file for complete search history.

(56) References Cited

U.S. PATENT DOCUMENTS

| 9,736,079 B2 | 8/2017 | Sze et al. | |
| 2005/0094665 A1* | 5/2005 | Nalawadi | H04L 41/0896 370/468 |
| 2011/0296006 A1* | 12/2011 | Krishnaswamy | H04L 61/6077 709/224 |
| 2014/0098796 A1* | 4/2014 | Xue | H04L 45/125 370/336 |

(Continued)

FOREIGN PATENT DOCUMENTS

| JP | 2006067075 A | 3/2006 |
| WO | 2014036640 A1 | 3/2014 |

OTHER PUBLICATIONS

Office Action issued in Japanese Appln. No. 2014-096122 dated Jan. 9, 2018.

(Continued)

*Primary Examiner* — Charles C Jiang
*Assistant Examiner* — Voster Preval
(74) *Attorney, Agent, or Firm* — Rossi, Kimms & McDowel LLP

(57) ABSTRACT

A transmission apparatus for transmitting packets through a plurality of transmission channels includes: an identifying unit configured to identify, as a candidate, one or more sets each including one or more transmission channels for use in transmitting a plurality of transmission target data packets, based on transmission speed of the plurality of transmission channels; and a determining unit configured to determine, among the one or more sets identified as the candidate by the identifying unit, a set including less number of transmission channels than another set, as a set of the transmission channel for use in transmitting the transmission target data packets.

17 Claims, 4 Drawing Sheets

| FRAME NUMBER | FRAME TRANSMISSION RATE | COMBINATION OF TRANSMISSION PATHS | TRANSMISSION PATH ELECTED |
|---|---|---|---|
| 01 | 110 Mbps | (A+B+C) | A+B+C |
| 02 | 30 Mbps | (A) or B | A |
| 03 | 15 Mbps | A or (B) or C | B |
| 04 | 15 Mbps | A or B or (C) | C |
| 05 | 20 Mbps | (A) or B or C | A |
| 06 | 25 Mbps | A or (B) | B |
| 07 | 15 Mbps | A or B or (C) | C |
| 08 | 30 Mbps | (A) or B | A |
| 09 | 15 Mbps | A or (B) or C | B |
| 10 | 70 Mbps | A+B or (A+C) | A+C |
| 11 | 15 Mbps | A or (B) or C | B |
| 12 | 25 Mbps | (A) or B | A |
| 13 | 10 Mbps | A or B or (C) | C |
| 14 | 15 Mbps | A or (B) or C | B |
| 15 | 25 Mbps | (A) or B | A |

(56) References Cited

U.S. PATENT DOCUMENTS

| | | | | |
|---|---|---|---|---|
| 2015/0103663 A1* | 4/2015 | Amini | ............... | H04B 1/0053 370/235 |
| 2015/0103769 A1* | 4/2015 | Kaichis | ............... | H04W 24/02 370/329 |
| 2015/0230150 A1* | 8/2015 | Wang | ............... | H04B 7/18506 370/252 |
| 2015/0295782 A1* | 10/2015 | Ramamoorthy | ...... | H04L 47/193 715/736 |
| 2016/0014793 A1* | 1/2016 | Klemp | ............... | H04W 48/18 370/329 |
| 2016/0095129 A1* | 3/2016 | Hoyhtya | ........... | H04W 72/0413 370/330 |
| 2016/0212759 A1* | 7/2016 | Schliwa-Bertling | ......................... | H04L 45/245 |

OTHER PUBLICATIONS

Singh et al. "MPRTP: Multipath Considerations for Real-time Media." MMSys'13 Proceedings of the 4th ACM Multimedia Systems Conference. Feb. 26, 2013: 190-201. Cited in NPL 1.

Ford et al."TCP Extensions for Multipath Operation with Multiple Addresses." Internet Engineering Task Force. Request for Comments: 6824. Jan. 2013: 1,34. Cited in NPL 1.

* cited by examiner

FIG. 3

| PATH | COMMUNICATION BAND |
|---|---|
| A | 60 Mbps |
| B | 40 Mbps |
| C | 20 Mbps |

FIG. 4

| FRAME NUMBER | FRAME TRANSMISSION RATE | COMBINATION OF TRANSMISSION PATHS | TRANSMISSION PATH ELECTED |
|---|---|---|---|
| 01 | 110 Mbps | [A+B+C] | A+B+C |
| 02 | 30 Mbps | [A] or B | A |
| 03 | 15 Mbps | A or [B] or C | B |
| 04 | 15 Mbps | A or B or [C] | C |
| 05 | 20 Mbps | [A] or B or C | A |
| 06 | 25 Mbps | A or [B] | B |
| 07 | 15 Mbps | A or B or [C] | C |
| 08 | 30 Mbps | [A] or B | A |
| 09 | 15 Mbps | A or [B] or C | B |
| 10 | 70 Mbps | A+B or [A+C] | A+C |
| 11 | 15 Mbps | A or [B] or C | B |
| 12 | 25 Mbps | [A] or B | A |
| 13 | 10 Mbps | A or B or [C] | C |
| 14 | 15 Mbps | A or [B] or C | B |
| 15 | 25 Mbps | [A] or B | A |

TRANSMISSION APPARATUS, METHOD FOR CONTROLLING TRANSMISSION, AND RECORDING MEDIUM

BACKGROUND OF THE INVENTION

Field of the Invention

The present invention relates to a transmission apparatus, a method for controlling transmission, and a program.

Description of the Related Art

Conventionally, technology for looking at and listening to streaming multimedia data such as a moving image and voice while using an IP (Internet Protocol) network is prevalent. For instance, a communication protocol is used which is referred to as an RTP (A Transport Protocol for Real-Time Applications, RFC 3550, IETF).

In addition, the image quality and the quality of video data which is passed through the IP network have been enhanced year by year, and a coding technology also has progressed due to an appearance of HEVC (High Efficiency Video Coding) having high compression efficiency, and the like.

On the other hand, the traffic of the media data has increased year by year, and accordingly the capacity of communication bands is required to be increased. In other words, it is required to maintain infrastructure and also to efficiently use a network band.

As a method for efficiently using the network band, there is a multipath transmission technology which concurrently uses a plurality of available network interfaces, and increases the capacity. As a protocol which supports the multipath transmission, there is a multipath TCP (Architectural Guidelines for Multipath TCP Development, RFC 6182, IETF). In addition, as other protocols, there are a multipath RTP and a CMT-SCTP (Concurrent Multipath Transfer using Stream Control Transmission Protocol).

In the multipath transmission which concurrently uses a plurality of transmission channels, such a case is also considered that the bands and jitters are different among the plurality of the used transmission channels. When packets are passed through a transmission channel having a narrow band and a long latency, there is a possibility that a delay to be spent before a receiving apparatus receives the packets results in being large, compared to the case where the packets are passed through a transmission channel having a wide band and a short latency. Japanese Patent Application Laid-Open No. 2006-67075 discloses a technology of controlling the quantity of data which is sorted into each of the transmission channels in consideration of a difference among bands, latencies and the like of each of the transmission channels.

However, in the multipath transmission, there has been a problem that when the movie data has been sorted into each transmission path packet by packet, reorder processing occurs, which leads to a delay in delivery. The transmission path means a set of transmission channels for use in transmitting transmission target data.

SUMMARY OF THE INVENTION

According to an aspect of the present invention, a transmission apparatus for transmitting data through a plurality of transmission channels comprises: an identifying unit configured to identify, as a candidate, one or more sets each including one or more transmission channels for use in transmitting a plurality of data packets of a transmission target, based on transmission speed of the plurality of transmission channels; and a determining unit configured to determine, among the one or more sets identified as the candidate by the identifying unit, a set including less number of transmission channels than another set, as a set of the transmission channel for use in the transmitting transmission target data.

Further features of the present invention will become apparent from the following description of exemplary embodiments with reference to the attached drawings.

BRIEF DESCRIPTION OF THE DRAWINGS

FIG. 3 is a view illustrating one example of a transmission speed.
FIG. 4 is a view illustrating an example in which a transmission path is determined.

DESCRIPTION OF THE EMBODIMENTS

Preferred embodiments of the present invention will now be described in detail in accordance with the accompanying drawings.

Figure 1:
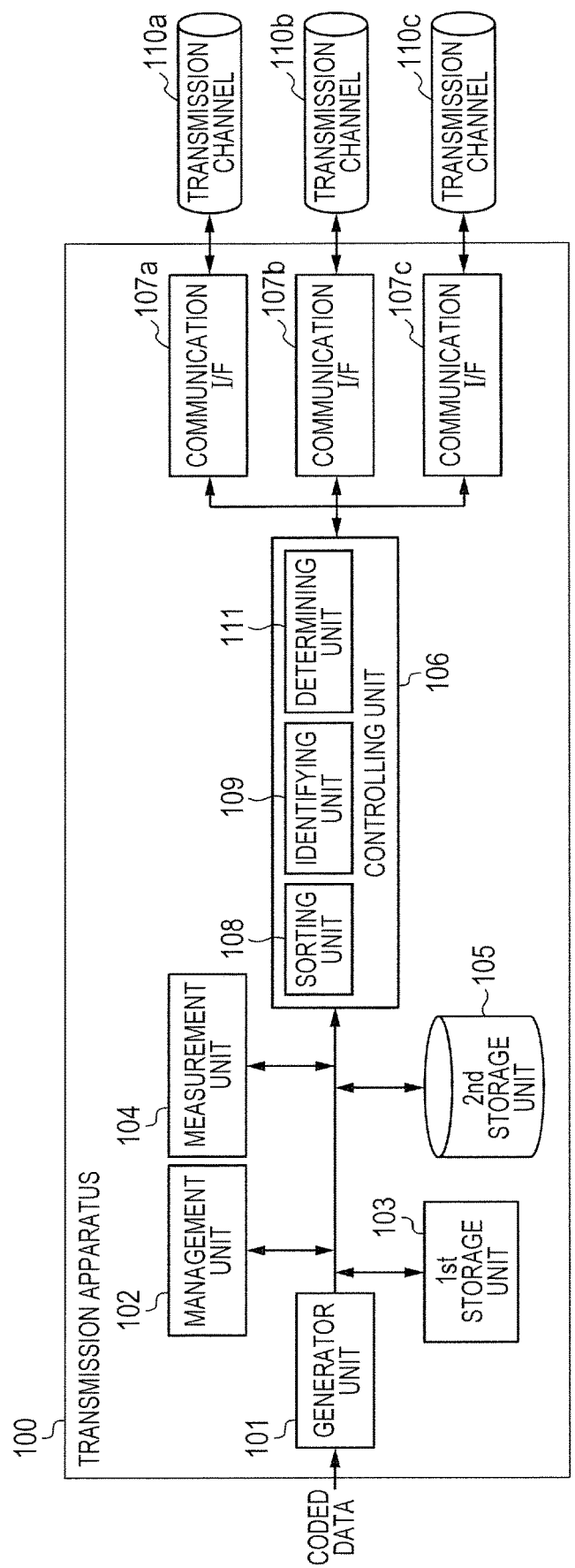
FIG. 1 is a view illustrating a transmission apparatus.

FIG. 1 is a view illustrating a transmission apparatus 100 according to an embodiment. The transmission apparatus 100 includes: a generator unit 101; a management unit 102; a 1st storage unit 103; a measurement unit 104; a 2nd storage unit 105; a controlling unit 106; and three communication I/Fs 107a to 107c.

Transmission channels 110a to 110c are networks such as a communication service of a mobile phone system of 3G, 4G and the like, the Internet, and LAN (Local Area Network). The communication I/Fs 107a to 107c are provided with a function of transmitting and receiving data, and are connected to the transmission channels 110a to 110c, respectively, so as to be capable of communicating with the respective transmission channels. The transmission apparatus 100 enables the multiple transmission which transmits data by using the plurality of transmission channels 110a to 110c in parallel. In addition, the communication unit may be wireless or wired. In addition, the transmission apparatus 100 may have the plurality of communication I/Fs and corresponding transmission channels, and the numbers thereof are not limited to the embodiment.

When coded data of moving images and voices has been input frame by frame, the generator unit 101 converts the coded data into transmission target data, divides the coded data into sizes suitable for communication, and generates packets. When the transmission apparatus 100 uses the RTP as a transmission protocol, for instance, the generator unit 101 divides the coded data, then further adds a header suitable for each type of media, and generates data packets for the RTP.

The management unit 102 generates size information on every frame of the input coded data, and holds this information. The 1st storage unit 103 stores information indicating a permissible period therein. In the present exemplary embodiment, the permissible period means a transmission time period which can be permitted when the coded data is transmitted frame by frame. The information indicating the permissible period shall be previously stored in a ROM (Read Only Memory) or the like.

The measurement unit 104 measures transmission speeds in each of the transmission channels 110a to 110c based on a Receiver Report (hereinafter referred to as RR) of RTCP, which is transmitted from a receiving apparatus. Transmission speed information includes communication band information. TFRC (TCP-Friendly Rate Control), for instance, is well known as a method for measuring a band usable for a UDP in a network which coexists with a data flow of TCP, and this measurement method can use information in RTCP RR. In addition, there is also a method of dividing a window size (also referred to as RWIN) in a side of the receiving apparatus by RTT (Round Trip Time), as a simple method.

The 2nd storage unit 105 stores transmission speed information therein that indicates the transmission speeds of each of the transmission channels 110a to 110c, which have been measured by the measurement unit 104. Incidentally, the transmission speed information which the 2nd storage unit 105 stores therein is updated every time the transmission speed is measured by the measurement unit 104. The controlling unit 106 has a sorting unit 108 which controls a session of communication with the receiving apparatus, and sorts transmission data into three communication I/Fs 107a to 107c.

Incidentally, a CPU (Central Processing Unit) reads out a program stored in the ROM or the like and executes this program, and thereby the processing for each unit illustrated in FIG. 1 and the following processing by the transmission apparatus 100 can be achieved.

Figure 2:
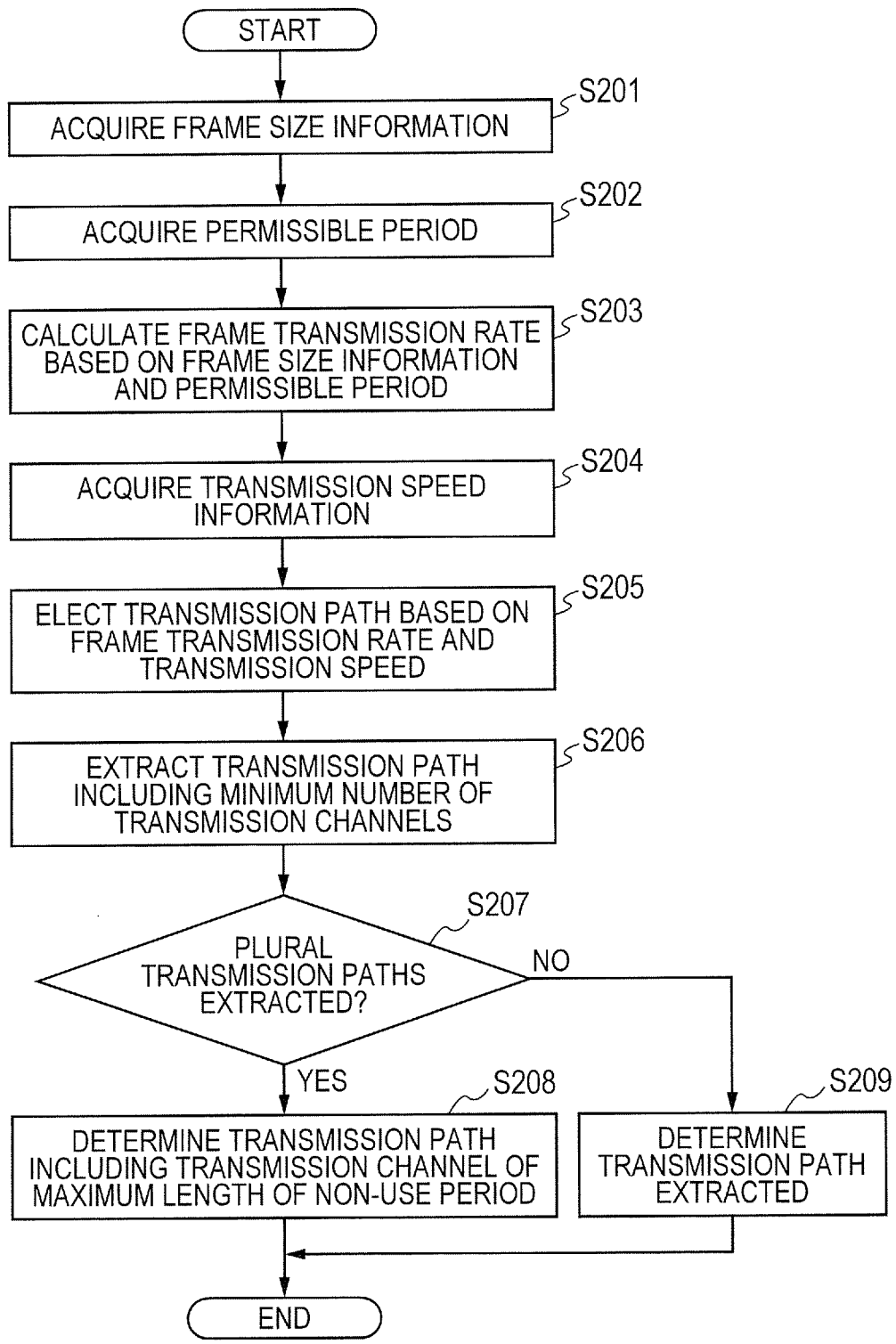
FIG. 2 is a flow chart illustrating transmission control processing.

FIG. 2 is a flow chart showing transmission control processing by the transmission apparatus 100. After the coded video data has been input, the packets have been generated and the frame size information has been held, the transmission apparatus 100 starts transmission control processing. In a step S201, the controlling unit 106 acquires the size information corresponding to one frame of the coded data which has been input from the management unit 102. Here, one frame is one example of a packet group including a plurality of packets. Next, in a step S202, the controlling unit 106 acquires a permissible period from the 1st storage unit 103. The permissible period means a length of a time period which is permitted as a time period necessary for transmitting the transmission target data (for instance, data corresponding to one frame).

Next, in a step S203, the controlling unit 106 calculates a frame transmission rate based on the frame size information and the permissible period (calculation processing). Here, the frame transmission rate is an example of a transmission speed which is permitted when the frame is transmitted, in other words, a permissible speed. The permissible speed is a transmission speed which is needed for a transmission channel in order that the transmission target data is transmitted within a predetermined permissible period. In the present exemplary embodiment, the controlling unit 106 divides the size of the frame by the permissible period, and thereby calculates the frame transmission rate. However, when the data is transmitted through the RTP, the quantity of data corresponding to the RTP header is added. Then, in this case, the controlling unit 106 may calculate the frame transmission rate in consideration of the quantity of data corresponding to data obtained by multiplying the RTP header size by the number of the divided packets.

Next, in a step S204, the controlling unit 106 acquires the transmission speed information on each of the transmission channels 110a to 110c. Next, in a step S205, an identifying unit 109 contained in the controlling unit 106 identifies a transmission path based on the transmission speed and the frame transmission rate. The transmission path is a set including one or a plurality of transmission channels for use in transmitting the transmission target data. For instance, suppose that the frame transmission rate of a frame of a processing object is 50 Mbps, and that the transmission speeds of three transmission channels A, B and C (which correspond to transmission channels 110a to 110c, respectively) are 60 Mbps, 40 Mbps and 20 Mbps respectively, as is illustrated in FIG. 3. In this case, the transmission speed of only A or a combination of B and C becomes a value larger than the frame transmission rate (50 Mbps). Accordingly, in this case, the controlling unit 106 identifies the transmission path of only A, and the transmission path of the combination of B and C. Thus, the identifying unit 109 identifies candidates of the sets of transmission channels which can transmit the transmission target data within a predetermined time period.

Next, in a step S206, a determining unit 111 in the controlling unit 106 determines a transmission path having fewer transmission channels included in the transmission path, out of the transmission paths which have been identified by the identifying unit 109, as a transmission path for use in transmitting the transmission target data. In the above described example, the transmission path of only A includes fewer transmission channels to be used. Accordingly, in this case, the controlling unit 106 extracts the transmission path of only A.

Next, in a step S207, the determining unit 111 in the controlling unit 106 checks whether the number of the determined transmission paths is plural or not. When there exist the plurality of transmission paths (in the case of Yes in S207), the controlling unit 106 advances the process to a step S208. When there exists only one transmission path (in the case of No in S207), the controlling unit 106 advances the process to a step S209.

In the step S208, the determining unit 111 in the controlling unit 106 determines a transmission path in which the transmission channel to be used in the transmission path has a longer non-use period, out of the plurality of transmission paths, as a transmission path which is used for the transmission of the frame of the processing object.

As in the above way, the determining unit 111 in the controlling unit 106 determines the set including the transmission channels having a longer non-use period, out of the plurality of sets having equal number of transmission channels included in the set of the transmission channels, as a set of the transmission channel for use in transmitting the transmission target data.

In the present exemplary embodiment, when the transmission apparatus transmits the data to the receiving apparatus, information (for instance, above described RR) showing a communication state of the transmission channel through which the data has been transmitted is transmitted from the receiving apparatus to the transmission apparatus. The information showing the communication state includes, for instance, the transmission speed of the data and the information for identifying a time period needed for transmitting the data. Thus, the transmission apparatus 100 can know the communication states of each of the transmission channels from the RR. However, in the transmission channel having the longer non-use period, the data is not transmitted. Accordingly, the transmission apparatus cannot receive the RR, and cannot know the communication states of the transmission channels.

Then, as in the present exemplary embodiment, the data is transmitted with the use of the transmission channel having the longer non-use period. Thereby, the transmission apparatus 100 receives the RR and can know the latest communication states concerning the transmission channels.

In addition, in a step S209, the controlling unit 106 determines one transmission path which has been extracted, as a transmission path to be used for the transmission of the frame of the processing object. Here, processes of the steps S208 and S209 are one example of determination processing which determines a transmission path including at least one transmission channel that is used for the transmission of the packet group, for each of the packet groups. The processes of the steps S208 and S209 determine a transmission path including one, two or more transmission channels which are used for the transmission of the packet group, for each of the packet groups. With the steps, the transmission control processing ends.

FIG. 4 is a view illustrating one example of: a frame transmission rate that has been calculated for a plurality of frames (frames of frame numbers "01" to "15") which constitute the coded data; selected transmission paths; and a transmission path which has been determined to be used for the transmission. The example illustrated in FIG. 4 corresponds to the transmission channels 110*a* to 110*c* having the transmission speeds illustrated in FIG. 3.

In the frame of the frame number "01", for instance, it is shown that the frame transmission rate 110 Mbps has been calculated, and only one of a combination of A, B and C has been selected as the transmission path. In addition, in the frame of the frame number "02", it is shown that the frame transmission rate 30 Mbps has been calculated, a transmission path of only A or only B has been selected as the transmission path, and the transmission path of only A has been determined out of the transmission paths.

In the example illustrated in FIG. 4, the transmission rate of the frame of the frame number "04" is 15 Mbps. Because of this, the transmission path of only A, only B or only C is selected. Furthermore, any one of the transmission paths is a path which uses only one transmission channel. Accordingly, in the step S206 as well, three transmission paths are extracted. In this case, in the step S208, the transmission path which uses only the transmission channel C that has the maximum length of the non-use period in the transmission of the frames of the frame numbers "01" to "03", which have been transmitted before the frame of the frame number "04", is determined as the transmission path to be used.

Note that such a method is also acceptable as another example that the controlling unit 106 compares the non-use period with a threshold in the step S208. Specifically, when the non-use period is the threshold or smaller, the controlling unit 106 determines to use a transmission path out of the plurality of transmission paths, according to previously set priority, and when the non-use period is larger than the threshold, determines to use a transmission path which includes a transmission channel having a longer non-use period.

Figure 5:
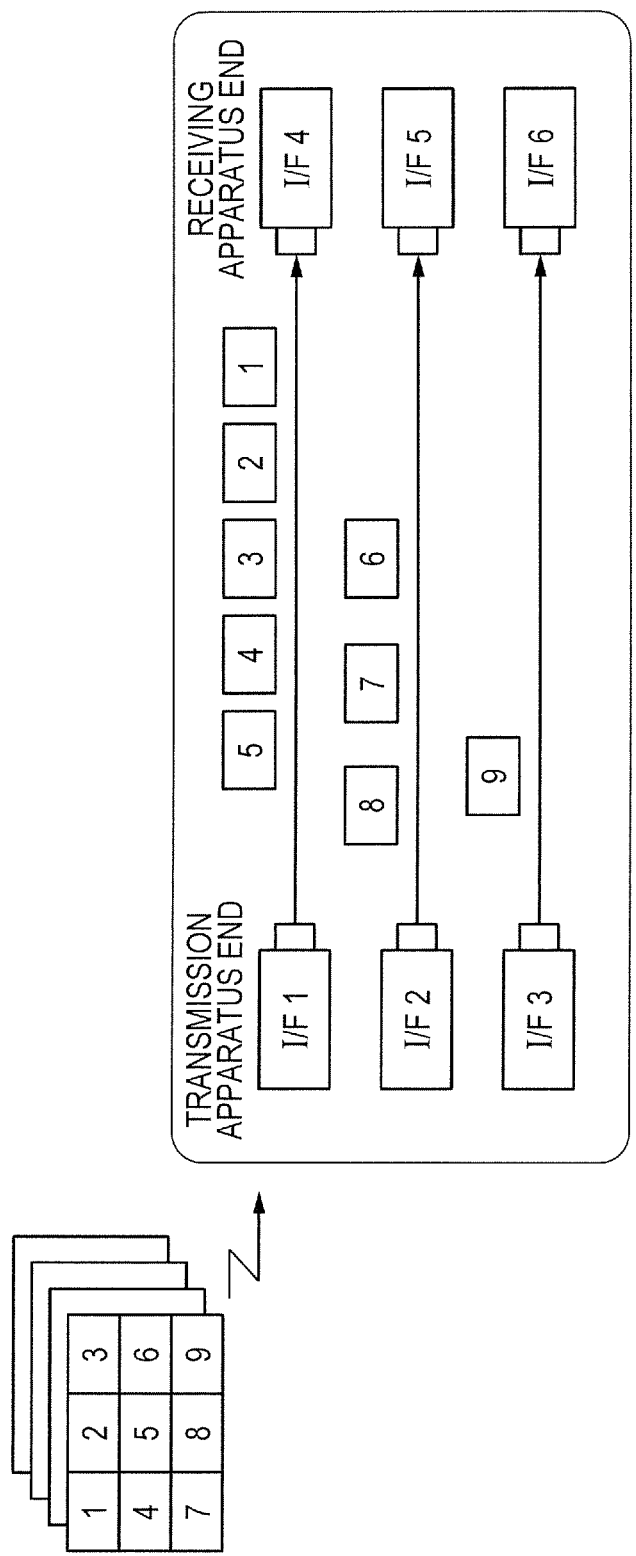
FIG. 5 is a view illustrating an example in which packets are transmitted.

Furthermore, when the determined transmission path includes the plurality of transmission channels, the sorting unit 108 in the controlling unit 106 sorts packets which constitute the frame, into each of the transmission channels (sorting processing). FIG. 5 is a view for describing this packet sorting processing. In the example of FIG. 5, assume that nine packets constitute one frame. In this case, the controlling unit 106 sorts the packets into the three transmission channels A to C so that the numbers of the sorted packets are proportional to the transmission speeds of each of the transmission channels A to C. Thereby, the occurrence ratio of a packet loss or the like can be controlled to be low, compared to the case where the packets are equally sorted to each of the transmission channels A to C.

As has been described above, the transmission apparatus 100 according to the present embodiment determines the transmission path frame by frame. Furthermore, the transmission apparatus 100 determines the transmission path so that the number of the transmission channels becomes fewer, with respect to each of the frames. Thereby, the transmission apparatus 100 can reduce the occurrence of reorder processing, while allotting data to the plurality of transmission channels. Specifically, the transmission apparatus 100 can reduce a delay in delivery of data by reducing the occurrence of the reorder processing, in multipath transmission.

Furthermore, when there exists a transmission channel having a longer non-use period, the transmission apparatus 100 uses a transmission path including the transmission channel. Accordingly, the transmission apparatus 100 can receive the RR concerning each of the transmission channels in response to the transmission of the data, and can periodically check the states of each of the transmission channels. Accordingly, the transmission apparatus 100 can enhance the accuracy of the communication quality for each of the transmission channels, without using a check packet or the like.

As for a first modified example of the transmission apparatus 100 according to the present embodiment, the transmission apparatus 100 may not have the 1st storage unit 103 and may acquire the permissible period from an external apparatus.

In addition, as for a second modified example, the controlling unit 106 may sort the packets based on a delay time period (latency or RTT) which is spent before the transmission apparatus receives a corresponding response after having transmitted a request, in processing of sorting packets. Specifically, the controlling unit 106 may sort the packets so that a packet having a smaller sequence number of an RTP header is delivered in increasing order of the delay time period of the transmission channel. Thereby, the receiving apparatus can receive the packets in increasing order of the sequence number of the RTP header, and accordingly can reduce a load at the time when the data is reconstructed.

As has been described above, the transmission apparatus in each of the above described embodiments reduces the occurrence of the reorder processing in the multipath transmission, and thereby can reduce the delay in the delivery of the data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-096122, filed May 7, 2014 which is hereby incorporated by reference herein in its entirety.

What is claimed is:

1. A transmission apparatus for transmitting data through a plurality of transmission channels, the transmission apparatus comprising:
a plurality of communication interfaces each configured to transmit data and associated with one of the plurality of transmission channels;
one or more memories storing instructions;
one or more hardware processors configured to implement the instructions to execute:
identifying, as a plurality of candidates, a plurality of paths satisfying both a condition that each path includes one or more transmission channels for transmitting transmission target data and a condition that each path is able to transmit transmission target data within a predetermined period, based on a transmission speed of each of the plurality of transmission channels and frame transmission rates of the transmission target data;
determining a path for transmitting the transmission target data, among the plurality of candidates, that includes less number of transmission channels than any other path of the plurality of candidates; and
transmitting the transmission target data via the communication interfaces associated with the determined path.

2. The transmission apparatus according to claim 1, wherein:
the transmission target data is image data of one frame,
the plurality of candidates are used for transmitting the image data comprising a plurality of frames, and
the determined path is for transmitting the image data of one frame.

3. The transmission apparatus according to claim 1, wherein the determining determines, in a case where the plurality of candidates include paths each including less number of transmission channels than any other path of the plurality of candidates, from among paths each including less number of transmission channels than any other path of the plurality of candidates, a path including the transmission channel of longer non-use period by the transmission apparatus, as the path for transmitting the transmission target data.

4. The transmission apparatus according to claim 1, wherein the one or more processors are configured to implement the instructions to further execute sorting the transmission target data, into each of the transmission channels included in the determined path, based on transmission speeds of the one or more transmission channels included in the determined path.

5. The transmission apparatus according to claim 3, wherein the identifying receives a newer transmission speed of the transmission channel of longer non-use period by the transmission apparatus by transmitting the transmission target data via the communication interfaces associated with the path including the transmission channel of longer non-use period by the transmission apparatus.

6. The transmission apparatus according to claim 1, wherein one of the plurality of transmission channels is a network of a communication service of a mobile phone system, the internet, or a local Area Network.

7. The transmission apparatus according to claim 1, wherein the frame transmission rates of the transmission target data are a transmission speed needed for completing a transmission of the transmission target data within a permissible period.

8. The transmission apparatus according to claim 1, wherein the transmitting transmits the transmission target data via the communication interfaces associated with the determined path using Multipath TCP, Multipath RTP, or CMT-SCTP.

9. The transmission apparatus according to claim 1, wherein the identifying identifies the plurality of paths having a transmission speed needed for completing a transmission of the transmission target data within a permissible period.

10. A controlling method of, for a transmission apparatus, transmitting a plurality of data through a plurality of transmission channels, the method comprising:
providing a plurality of communication interfaces each configured to transmit data and associated with one of the plurality of transmission channels;
identifying, as a plurality of candidates, a plurality of paths satisfying both a condition that each path includes one or more transmission channels for transmitting transmission target data and a condition that each path is able to transmit transmission target data within a predetermined period, based on a transmission speed of each of the plurality of transmission channels and frame transmission rates of the transmission target data;
determining a path for transmitting the transmission target data, among the plurality of candidates, that includes less number of transmission channels than any other path of the plurality of candidates; and
transmitting the transmission target data via controlling the communication interfaces associated with the determined path.

11. The method according to claim 10, wherein:
the transmission target data is image data of one frame,
the plurality of candidates are used for transmitting the image data comprising a plurality of frames, and
the determined path is for transmitting the image data of one frame.

12. The method according to claim 10, wherein the determining determines, in a case where the plurality of candidates include paths each including less number of transmission channels than any other path of the plurality of candidates, from among the paths each including less number of transmission channels than any other path of the plurality of candidates, a path including the transmission channel of longer non-use period, as the path for transmitting the transmission target data.

13. The method according to claim 10, further comprising sorting the transmission target data, into each of the transmission channels included in the determined path, based on transmission speeds of the one or more transmission channels included in the determined path.

14. A non-transitory computer-readable recording medium storing a readable program executable by a computer of a transmission apparatus to execute a controlling method of transmitting data through a plurality of transmission channels, the method comprising:

provoking a plurality of communication interfaces each configured to transmit data and associated with one of the plurality of transmission channels;

identifying, as a plurality of candidates, a plurality of paths satisfying both a condition that each path includes one or more transmission channels for transmitting transmission target data and a condition that each path is able to transmit transmission target data within a predetermined period, based on a transmission speed of each of the plurality of transmission channels and frame transmission rates of the transmission target data;

determining a path for transmitting the transmission target data, among the plurality of candidates, that includes less number of transmission channels than any other path of the plurality of candidates; and transmitting the transmission target data via controlling the communication interfaces associated with the determined path.

15. The recording medium according to claim 14, wherein:

the transmission target data is image data of one frame, the plurality of candidates are used for transmitting the image data comprising a plurality of frames, and the determined path is for transmitting the image data of one frame.

16. The recording medium according to claim 14, wherein the determining determines, in a case where the plurality of candidates include paths each including less number of transmission channels than any other path of the plurality of candidates, from among the paths each including less number of transmission channels than any other path of the plurality of candidates, a path including the transmission channels of longer non-use period, as the path for transmitting the transmission target data.

17. The recording medium according to claim 14, further comprising sorting the transmission target data, into each of the transmission channels included in the determined path, based on transmission speeds of the one or more transmission channels included in the determined path.

* * * * *